United States Patent [19]

Ohta et al.

[11] Patent Number: 4,547,875
[45] Date of Patent: Oct. 15, 1985

[54] OPTICAL RECORDING AND RETRIEVING DISC

[75] Inventors: Takeo Ohta, Nara; Tatsushi Nakamura, Moriguchi; Nobuo Akahira, Yawata, all of Japan

[73] Assignee: Matsushita Electric Industrial Co., Ltd., Osaka, Japan

[21] Appl. No.: 433,264

[22] Filed: Oct. 7, 1982

[30] Foreign Application Priority Data

Oct. 9, 1981 [JP] Japan .................. 56-161634

[51] Int. Cl.⁴ .............................. G11B 7/00
[52] U.S. Cl. ........................ 369/275; 369/109
[58] Field of Search .......... 369/44, 45, 46, 109, 369/110, 111, 275; 358/342

[56] References Cited

U.S. PATENT DOCUMENTS

| | | | |
|---|---|---|---|
| 4,209,804 | 6/1980 | Dil | 369/109 |
| 4,238,843 | 12/1980 | Carasso et al. | 358/342 |
| 4,310,910 | 1/1982 | Sheng | 369/109 |
| 4,310,916 | 1/1982 | Dil | 369/109 |
| 4,325,135 | 4/1982 | Dil et al. | 369/110 |
| 4,359,750 | 11/1982 | Howe | 369/275 |
| 4,423,502 | 12/1983 | Dil | 369/275 |

OTHER PUBLICATIONS

Ping Sheng, "Theoretical Considerations of Optical Diffraction from RCA Videodisc Signals", RCA Review, vol. 39, Sep. 1978, pp. 512–531.
"Electronik 1978" vol. 27, No. 15, pp. 31–34.

Primary Examiner—Donald McElheny, Jr.
Attorney, Agent, or Firm—Stevens, Davis, Miller & Mosher

[57] ABSTRACT

An optical disc for optical recording, retrieving and erasing of informations. The phase difference $\psi$ of reflected light produced by the tracking groove in the form of convexity or protrusion of concavity or groove and the change $\Delta\psi$ in the phase difference caused by a recording in a recording film are selected in relation to each other to provide a stable detection signal for tracking, thereby to permit a highly accurate tracking on the optical disc carrying information at a high density.

3 Claims, 7 Drawing Figures

OPTICAL RECORDING AND RETRIEVING DISC

BACKGROUND OF THE INVENTION

The present invention relates to an optical recording and retrieving disc capable of recording and retrieving information optically and usable as a most useful information file of large capacity. More particularly, the invention is concerned with an optical disc which permits recording, erasing and retrieving of information, and is usable as a superior medium in place of conventionally used magnetic discs.

Because no direct contact between the pickup and the information carrier is required, the optical information recording and retrieving system offers various advantages in protection of the pickup and information carrier from wear and damage, high speed of access to the information and so forth.

In the case where the information carrier carries the information at a high density, however, it is necessary to control the irradiating light spot to accurately follow up the information track.

To cope with this demand, some methods have been proposed one of which is a method generally called 3 (three) beam method. According to this three-beam method, the irradiating light beam is decomposed by a diffraction grating into three spots: namely, 0 (zero) degree light spot, +1 degree light spot and −1 degree light spot. The irradiation is made onto the information track in such a manner that these three spots are arrayed in a line which is inclined by a small angle from the information tracks so that the 0 degree light spot irradiates the mid point on the information track while the +1 degree light spot and the −1 degree light spot irradiate points which are slighly deviated to the left and right, respectively, from the information track.

The traction detecting section is composed of a portion which retrieves the signal upon detecting the reflection of the 0 degree light spot, and includes also a first sensor for sensing the reflection of the +1 degree light spot and a second sensor for sensing the reflection of the −1 degree light spot. It is possible to detect the direction and amount of deviation of the irradiating light beam from the information track through detecting the difference between the outputs from the first and second sensors and, hence, to effect accurate tracking control by controlling the irradiating light beam in such a manner as to nullify the difference between the outputs of two sensors. This method, however, suffers problems such as necessity for the means for decomposing the irradiating light beam into three spots and reduced intensity of irradiation of track due to the decomposition of the light beam, although it affords a stable tracking.

Another known method for the tracking is a method called "far field method". This method applies to an information carrier in which informations are recorded on a substrate having a refractive index n in the form of concavity and convexity or step having a height difference. In operation, a light spot of a wavelength $\lambda$ is applied to the top surface and bottom surface of a portion of the track having a height difference $\Delta l$, so that a phase difference $\psi$ expressed by the following formula is formed between the light reflected by the top surface and the light reflected by the bottom surface.

$$\psi = 4\pi \cdot \Delta l \cdot n / \lambda$$

These two reflected light beams make interference and diffraction to produce a far field pattern the intensity distribution of which is varied in accordance with a change in the relative position between the light spot and the step. The change of the intensity distribution is detected by a first optical sensor and a second optical sensor which are disposed in the tracking detection section. When the light spot is irradiating the stepped portion of the track in a symetrical form, the far field pattern of the reflected light exhibits a symetrical intensity distribution. The first and second optical sensors are arranged such that they produce outputs of an equal level when the far field pattern a symmetrical intensity distribution. Therefore, if the light spot deviates from the point of symmetry of the stepped portion, the intensity distribution in the far field pattern changes to cause a change in the difference between the outputs from the first and second sensors. By detecting this change, it is possible to measure the direction and amount of deviation of the light spot from the track and, hence, it is possible to accurately hold the light spot accurately in the information recording track groove, i.e. to effect an accurate tracking, by controlling the position of the light spot so as to nullify the difference between the outputs from the two sensors. This tracking method is superior in that the tracking can be made effected accurately with a single light spot.

Electronik 1978, Vol. 27, No. 15, pages 31-34 discloses an optical recording and retrieving disc having a substrate with pre-grooved spiral tracks. Pits are formed in a recording film on the substrate in order to record information. The phase difference between the light reflected from the non-recording portion of the film and from the pits is utilized for tracking.

SUMMARY OF THE INVENTION

An object of the invention is to provide an optical recording and retrieving disc which is adapted to record information by a change in the refractive index, or by a change in both the refractive index and absorption coefficient of a photosensitive layer or recording film due to irradiation by light, the disc also being adapted to facilitate stabilization of the tracking operation for guiding a source of the irradiating light such that it follows a predetermined scanning path.

In order to effect tracking of the disc by laser beam, a method is used which makes use of a far field pattern produced by the phase difference of light beams reflected from convex tracking ridges previously formed on the substrate of the disc.

The disc according to the invention is adapted to facilitate tracking stabilization by selecting the thickness of the recording film so that the value of $|\sin \Delta\psi|$ is a zero or a minimum, where $\Delta\psi$ represents a phase difference between light reflected from a recorded portion of the film and light reflected from a non-recorded portion of the film.

It is another object of the invention to provide a disc having a guide ridge on which a recording film is formed in such a manner that the phase difference of light beams reflected from this film, i.e. the phase difference between the light reflected by the top surface of the film and the light reflected by the bottom surface of the film does, not disturb the phase difference of the light beams reflected by the guide ridge.

An embodiment of the invention will now be described with reference to certain aspects of the accompanying drawings.

DESCRIPTION OF THE PREFERRED EMBODIMENT

The tracking ridges and grooves for guiding the laser beam is formed on the surface of a resin substrate by a transfer from a stamper having complementary grooves and ridges. The optical recording and retrieving disc of the invention is produced by forming a recording film on this substrate having the groove and ridges. As the material of the recording film, it is possible to use a material which changes its optical constants by the application of a laser beam.

In an information carrier having a recording film which changes its refractive index or both its refractive index and absorption coefficient, the tracking output varies in accordance with the thickness of the recording film.

It is assumed here that a groove track having a depth of $\Delta l$ and a width of S is formed spirally or in the form of concentric circles in the disc surface, and that a recording film formed on the groove track is adapted to change its refractive index, or both its refractive index and absorption coefficient as the information is recorded therein. When a light beam is applied to this disc, a phase difference $\Delta \psi$ is produced between the light beam reflected by the portion of the film in which the information is recorded and the light beam reflected by the non-recorded. This phase difference $\Delta \psi$ is added to the phase difference $\psi$ originally produced by the step height $\Delta l$ of the grooved track which is represented by $\psi = 4\pi \cdot \Delta l \cdot n / \lambda$.

Thus, before the recording of information, a differential output A-C of tracking is obtained due to the phase difference $\psi$ caused by the step height $\Delta l$, but this differential output is changed by the addition of $\Delta \psi$ after the recording.

In consequence, the tracking output fluctuates due to the addition of the phase difference $\Delta \psi$ to the phase difference $\psi$, often resulting in an unstable tracking.

It is a primary object of the invention to obviate the lack of stability in tracking caused by the phase difference produced as a result of the recording.

Figure 1A:
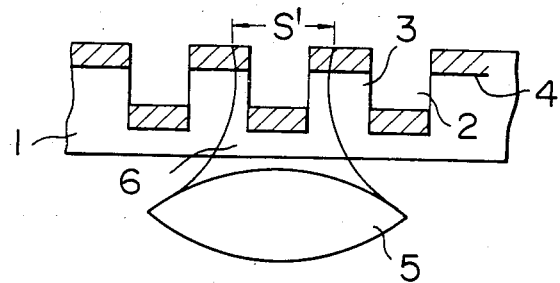
FIG. 1a is a sectional view of an optical recording disc having a recording film formed on a substrate provided with guide groove tracks consisting of grooves and ridges.
Figure 1B:
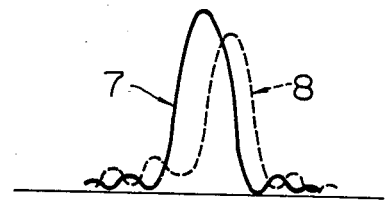
FIG. 1b is an illustration of a portion irradiated by a light spot and an intensity distribution of a far field pattern produced by the light beams reflected by the irradiated portion.
Figure 1C:
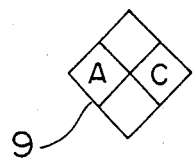
FIG. 1c is an illustration of a sensor for tracking.

Referring first to FIG. 1, there is shown in section an information carrier having tracks of a width S in the form of ridges 2 and grooves 3, to which is applied, through a lens a light spot having a spot diameter S′. The information carrier has a transparent substrate made of, for example, an acrylic resin (PMMA) and has a disc-like form of a diameter of 200 mm. A recording film 4 is formed on this substrate 1. In the preferred embodiment of the invention, the groove track for at recording is the portion designated at 2 in the case of the ridge. The track width S is, for example, 0.7 μm.

Although not exclusive, a material consisting mainly of a thin film of low oxides of tellurium TeOx ($0 < x < 2.0$) is used as the material of the recording film.

The step height $\Delta l$ of the ridge and groove is determined in relation to the wavelength $\lambda$ to meet the condition of $\Delta l = \lambda / 8n$, representing the refractive index of the transparent substrate by n. In the case of an acrylic resin, the refractive index n usually ranges between $1.50 + 0.01$ and $1.50 - 0.01$. A light spot 6 is applied to the information carrier through a lens 5.

When the light spot 5 of a diameter S′ of 1.0 μm irradiates the groove track in a symmetrical form, the far field pattern of the reflected light exhibits a symmetrical distribution of intensity as shown by full-line curve 7 in FIG. 1b. However, if the light spot is deviated from the center of the groove to either direction, an asymmetrical intensity distribution is formed as shown by, for example, broken-line curve 8.

Photosensors A and C are disposed at positions irradiated by the far field pattern. These photosensors A and C in combination constitute a tracking detection section 9. It will be seen that, if the groove is irradiated by the light spot in a symmetrical form, the difference between the outputs from two sensors is zero. However, if the light spot is deviated to either side, the character and magnitude of the output difference are changed to enable the direction and amount of deviation to be detected.

Figures 2A, 2B:
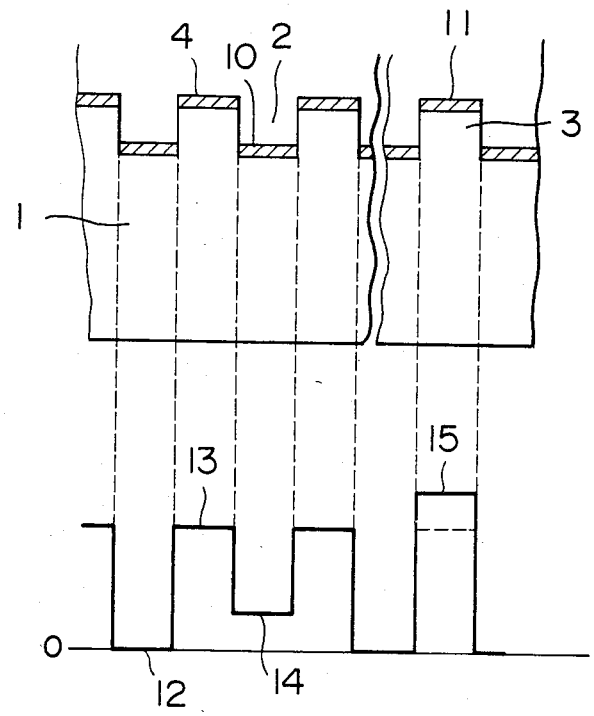
FIG. 2a is a sectional view of an optical recording disc in which recording has been made by using a guide ridge track or guide groove track as the recording track.
FIG. 2b is a schematic illustration of the lengths of light paths of light reflected from respective portions of the optical recording disc and change of the lengths of light paths due to recording.

FIG. 2a shows two examples in the state of information recorded on this recording film. Namely, a reference numeral 10 desigates a recorded information on the film 4 which is on the convexed or ridge portion 2 as viewed from the substrate 1, i.e. from the source of irradiating light, whereas a reference numeral 11 shows the recorded information in the recording film 4 in the concavity or groove 3 as viewed from the substrate 1, i.e. from the source of irradiating light.

On the other hand, FIG. 2b shows the lengths of paths reflected light, on the basis of the length of path of light reflected from the film on the groove which is convexed as viewed from the substrate, namely, representing this length by zero. The comparison of the light path lengths is made for the light which impinges upon the film from the substrate side and is reflected toward the substrate. Since the substrate has a large refractive index of 1.5, the light path length of the light reflected from the film 4 of the concaved portion is large as indicated at a numeral 13. In contrast, the light path length of the light reflected from the convexed portion takes a level indicated by a numeral 12.

When a material mainly consisting of thin film of low oxide of tellurium TeOx ($x \approx 1.0$) is used as the recording film 4, this film 4 changes its optical characteristics due to a phase shift when heated by an irradiation by light spot. In consequence, the refractive index and absorption coefficient of this film are increased as a result of recording. For instance, when the wavelength λ is 830 μm, the refraction index n is 3.1 and the attenuation coefficient k is 0.9 in the state before recording. The refractive index and the attenuation coefficient, however, are increased to 3.6 and 1.3, respectively, as a result of the recording. As a result of this change, the reflection factor of the film is changed to permit recording and retrieving of the information. In consequence, the length of path of reflected light is changed as a result of the recording, as shown in FIG. 2b, so that the phase difference between the reflected light beams is changed as a result of the recording. For instance, selecting the length of light path of the light reflected from the non-recorded film on the convexed portion of the track as the base or reference, i.e. zero, the length of path of light reflected from this portion is indicated by a numeral 12. In contrast, the length of light path of the light reflected from the film 4 on the concaved portion is given by 2·Δl·n, representing the refractive index of the material by n and the step height by Δl. This length is denoted by numeral 13 in FIG. 2b.

The lengths of light paths after the recording are shown for each of two cases. In the first case, the portion 2 which is convex as viewed from the substrate side is used as the recording track. A reference side is used as the recording track. A reference numeral 10 in FIG. 2a shows the state in which the recording is made in this portion 2. In this portion, the refractive index and the attenuation coefficient are increased as compared with the state before the recording, so that the length of light path is increased as compared with the reference level in the state before the recording, as indicated by a reference numeral 14 in FIG. 2b. In this case, the phase difference which is represented by 2π·path length difference/wavelength is decreased to reduce the tracking output. Therefore, when the recording is effected on the track formed by the convexed portion, it is desirable to select the conditions to diminish this phase difference. This can be achieved by determining the phase difference variation Δψ from the film thickness d of the recording film and then selecting the film thickness so as to minimize sin Δψ.

Figures 3A, 3B:
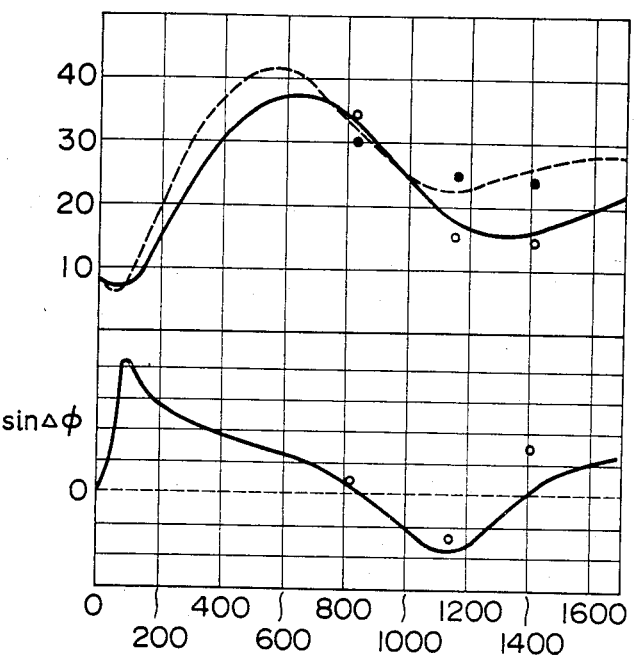
FIG. 3a shows the film-thickness dependency of reflection factor of the film before and after the recording.
FIG. 3b shows the film-thickness dependency of phase difference between the light reflected from the recorded portion and non-recorded portion.

FIG. 3a shows the reflection factor R (%) before and after the recording in relation to the film thickness d (Å).

The retrieving of the information is made through the detection of difference of the reflection factor. In FIG. 3a, the full-line curve shows the reflection factor of the film portion in which no recording is made, while broken-line curve shows the reflection factor of the film portion in which recording has been made. Namely, marks indicate the measurements of the reflection factor in the film portion where no recording is made, while marks represents the measurements in the portion of the film in which the recording has been made.

For a better retrieving of information, it is desirable to determine the film thickness d in the region which provides greater difference of the reflection factor.

FIG. 3b shows the values of sin Δψ for various values of phase difference between the light reflected from the recorded portion and the light reflected from the non-recorded portion. As stated before, when the convexed portion is utilized as the recording track, it is necessary to select the film thickness so that the value sin Δψ is zero or or a minimum. As will be seen from FIG. 3b, such a value of sin Δψ is obtained when the film thickness d ranges between 800 Å and 1400 Å. Within this range, a particularly large difference of the reflection factor is obtained when the film thickness d is 1400 Å. This film thickness, therefore, is selected as the optimum film thickness which eliminates the change of the tracking output.

According to the invention, it is possible to obtain a stable tracking output, regardless of whether the recording has been made or not, by selecting the film thicknes d such that, in the case where information is recorded on the convexed portion, the value of sin Δψ is zero or a minimum.

As will be clear to those skilled in the art, it is possible to continuously obtain a far field pattern of diffraction attributable to the step height and, hence, to maintain a high accuracy of the tracking control, by selecting the width S of the recording groove track in relation to the diameter S' of the light spot to meet the condition of S<S'.

What is claimed is:

1. An optical recording and reproducing disc comprising: substrate having groove tracks in the form of concavity or convexity, and a recording film formed on said substrate, said recording film being adapted to change its refractive index or both its refractive index and absorption coefficient, wherein, the phase difference between the light reflected from a recorded portion of said recording film and the light reflected from a non-recorded portion of said recording film is represented by Δψ, and the thickness of said recording film is selected such that the value sin Δψ is substantially zero.

2. An optical recording and retrieving disc according to claim 1, wherein the width of the groove track is selected to be smaller than the diameter of the recording or retrieving light spot.

3. An optical recording and retrieving disc according to claim 1, wherein said recording film consists mainly of a thin low oxide film TeOx (0<x<2.0).

* * * * *